July 10, 1923.
W. P. KOEPFLER
GREASE CUP
Filed March 31, 1922
1,461,665
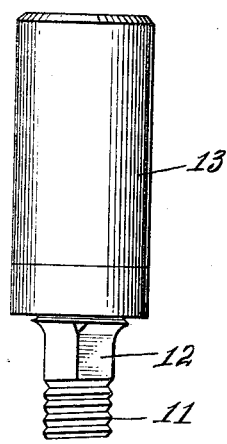
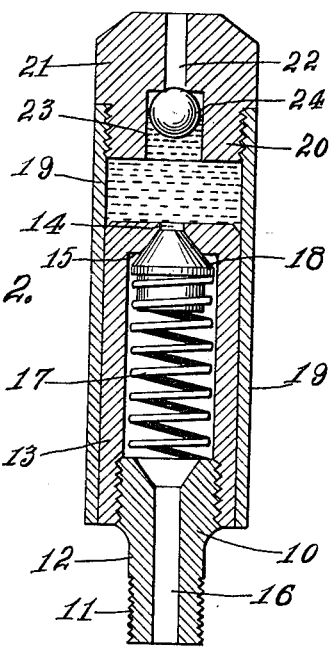
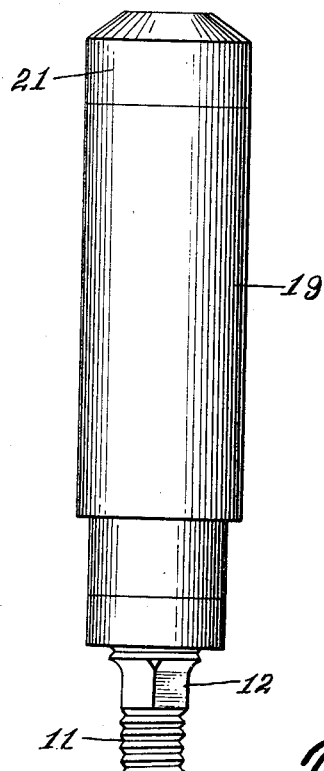
William P. Koepfler
INVENTOR
BY Victor J. Evans
ATTORNEY
WITNESS:

Patented July 10, 1923.

1,461,665

UNITED STATES PATENT OFFICE.

WILLIAM PETER KOEPFLER, OF PONCHATOULA, LOUISIANA.

GREASE CUP.

Application filed March 31, 1922. Serial No. 548,400.

*To all whom it may concern:*

Be it known that I, WILLIAM PETER KOEPFLER, a citizen of the United States, residing at Ponchatoula, in the parish of Tangipahoa and State of Louisiana, have invented new and useful Improvements in Grease Cups, of which the following is a specification.

This invention relates to lubricating devices, particularly to oil or grease cups, and has for its object the provision of a device of this character in combination with a filler designed to be filled with oil or grease and to be slipped over the oil cup proper whereby to fill the latter, the container of the oil or grease cup being provided with a spring-pressed valve and the filler being provided in its end with a valve, these valves cooperating to permit the injection of grease or oil into the cup without unscrewing any of the parts thereof.

Another object is the provision of a device of this character in which the grease cup proper is provided with a valve which is spring-pressed, the valve not only operating as above stated in permitting the filling of the container, but also permitting the inlet of air to replace the grease or oil passing out of the device to the location where the lubrication is desired, the spring furthermore operating to agitate the grease when vibration occurs in the event that the device is attached to a movable element of an engine of other mechanism.

An additional object is the provision of a device of this character which will be simple and inexpensive in manufacture, highly efficient in use, positive in action, durable in service, and a general improvement in the art.

With the above and other objects and advantages in view, the invention consists in the details of construction to be hereinafter more fully described and claimed and illustrated in the accompanying drawings in which—

Figure 1 is a side elevation of my device.

Figure 2 is a longitudinal section therethrough.

Figure 3 is a similar view showing the filling member in association therewith.

Referring more particularly to the drawings, I have shown my device as comprising a base portion which is formed as a cylindrical body 10 having one end reduced and threaded, as indicated at 11, for screwing engagement within a threaded hole in the bearing to be lubricated. Intermediate its ends this body is formed with an angular portion 12 for engagement by a wrench or the like whereby an efficient grip may be obtained for effecting a screwing action. This body is externally threaded at its other end and upon it is screwed a cylindrical container 13 which has its upper end closed except for a small hole 14 which is surrounded by a valve seat 15. It should also be stated that the body 10 is formed with a bore 16 for the outlet of lubricant to the bearing.

Located within the container 13 is a coil spring 17 which has one end engaging against the inner end of the body 10 and which has its other end carrying a valve 18 cooperating with the seat 15.

In the use of the device it will be seen that oil or grease within the container will pass gravitationally through the bore 16 to the location where lubrication is desired. It is also to be noted that the vibration of the spring during movement of the machinery to which the device is applied or with which it is used, will operate to keep the grease agitated which will have obvious advantages.

In order that the device may be quickly and easily filled, I make use of a filler which is formed as a cylindrical shell 19 of a size to be telescopically engaged over the container 13. This shell is smooth on the inside at one end and is threaded at the other end, and screwed into the threaded end is a reduced end 20 of a cap 21 which is formed with a bore 22 leading into a chamber 23 within which is movably mounted a ball 24 which operates as a valve to close the bore 22. In effecting filling of the grease cup, the shell 19 is filled with grease and is then slipped over the container 13 and forced downwardly thereover. The pressure results in holding the ball 24 seated so that the grease within the shell 19 will be forced into the container 13 through the hole 14 therein, the valve 18 unseating. When the container has been filled, the shell 19 is withdrawn and when such withdrawing action occurs the ball 24 will unseat from the bore 22 and allow the inlet of air so as to prevent the formation of a vacuum in the shell.

From the foregoing description and a study of the drawings it will be apparent that I have thus provided a simply constructed and consequently inexpensive grease cup which will be very highly efficient in lubricating any desired bearings or other locations where grease is required. It is also to be observed that I have provided a very efficient filling means by means of which a large number of containers may be filled with grease in a very short time.

While I have shown and described the preferred embodiment of my invention, it is of course to be understood that I reserve the right to make such changes in the form, construction and arrangement of parts as will not depart from the spirit of the invention or the scope of the subjoined claim.

What is claimed:—

A grease cup provided with a spring pressed valve, in combination with a sliding cup filler formed as a shell telescopically engageable with the grease cup and having its upper end closed except for a bore leading into a chamber, and an upwardly seating valve for closing said bore.

In testimony whereof I affix my signature.

WILLIAM PETER KOEPFLER.